(12) United States Patent
Fuller et al.

(10) Patent No.: US 8,509,094 B2
(45) Date of Patent: Aug. 13, 2013

(54) EDGE-BASED LOSS-OF-SIGNAL DETECTION

(75) Inventors: Andrew M. Fuller, Durham, NC (US);
John W. Poulton, Chapel Hill, NC (US)

(73) Assignee: Rambus Inc., Sunnyvale, CA (US)

( * ) Notice: Subject to any disclaimer, the term of this patent is extended or adjusted under 35 U.S.C. 154(b) by 415 days.

(21) Appl. No.: 12/745,489

(22) PCT Filed: Dec. 2, 2008

(86) PCT No.: PCT/US2008/085240
§ 371 (c)(1),
(2), (4) Date: May 28, 2010

(87) PCT Pub. No.: WO2009/076097
PCT Pub. Date: Jun. 18, 2009

(65) Prior Publication Data
US 2010/0309791 A1 Dec. 9, 2010

Related U.S. Application Data

(60) Provisional application No. 60/992,890, filed on Dec. 6, 2007.

(51) Int. Cl.
*G01R 31/08* (2006.01)
(52) U.S. Cl.
USPC .......................................... 370/242
(58) Field of Classification Search
USPC ......... 370/368, 375, 241–253, 476, 532–541, 370/502–520; 398/10–19, 25–38, 151–156; 702/85–107
See application file for complete search history.

(56) References Cited

U.S. PATENT DOCUMENTS

| | | | |
|---|---|---|---|
| 3,463,887 A * | 8/1969 | Ito | 370/509 |
| 3,882,540 A * | 5/1975 | Ottesen | 360/39 |
| 3,995,272 A * | 11/1976 | Prill | 342/399 |
| 4,339,823 A * | 7/1982 | Predina et al. | 375/294 |
| 4,773,085 A * | 9/1988 | Cordell | 375/375 |
| 4,926,447 A * | 5/1990 | Corsetto et al. | 375/376 |
| 5,289,060 A | 2/1994 | Elnashar et al. | |
| 5,329,559 A * | 7/1994 | Wong et al. | 375/373 |
| 5,361,398 A * | 11/1994 | Christian et al. | 455/503 |
| 5,375,142 A * | 12/1994 | Pitot et al. | 375/224 |
| 5,406,429 A * | 4/1995 | Noguchi et al. | 360/65 |
| 5,579,321 A * | 11/1996 | Van Grinsven et al. | 370/442 |
| 5,732,089 A | 3/1998 | Negi | |
| 5,926,047 A | 7/1999 | Harrison | |
| 6,243,369 B1 * | 6/2001 | Grimwood et al. | 370/335 |
| 6,377,082 B1 | 4/2002 | Loinaz | |
| 6,745,337 B1 * | 6/2004 | Trivedi et al. | 713/400 |

(Continued)

OTHER PUBLICATIONS

CN Office Action dated Jul. 10, 2012 in CN Application No. 200880119310.8. 19 pages.

(Continued)

*Primary Examiner* — Asad Nawaz
*Assistant Examiner* — Syed S Ali

(57) ABSTRACT

Systems and methods are provided for edge-based loss-of-signal (LOS) detection. In a receiver, a receiver port receives a data signal. A clock and data recovery (CDR) mechanism coupled to the receive port derives one or more clock signals. An LOS signal generation mechanism generates an LOS signal based on edge glitches which occur when the receive port does not receive usable data.

27 Claims, 8 Drawing Sheets

(56) References Cited

U.S. PATENT DOCUMENTS

| | | | |
|---|---|---|---|
| 6,799,131 B1* | 9/2004 | Steiner et al. | 702/107 |
| 7,263,151 B2 | 8/2007 | Montaz | |
| 2003/0058970 A1* | 3/2003 | Hamre et al. | 375/342 |
| 2003/0105784 A1* | 6/2003 | Schmidt | 708/100 |
| 2003/0117901 A1* | 6/2003 | Takada et al. | 368/47 |
| 2003/0164724 A1* | 9/2003 | Momtaz et al. | 327/165 |
| 2003/0219143 A1* | 11/2003 | Moskowitz et al. | 382/100 |
| 2004/0122620 A1* | 6/2004 | Doi et al. | 702/182 |
| 2004/0141567 A1* | 7/2004 | Yang et al. | 375/287 |
| 2004/0161068 A1* | 8/2004 | Zerbe et al. | 375/355 |
| 2004/0183518 A1* | 9/2004 | Weller et al. | 324/76.58 |
| 2004/0190649 A1* | 9/2004 | Endres et al. | 375/326 |
| 2004/0203559 A1* | 10/2004 | Stojanovic et al. | 455/403 |
| 2004/0205416 A1* | 10/2004 | Shirota | 714/48 |
| 2004/0264615 A1 | 12/2004 | Ho et al. | |
| 2005/0013354 A1* | 1/2005 | Fredriksson | 375/224 |
| 2005/0050387 A1* | 3/2005 | Mariani et al. | 714/13 |
| 2005/0058234 A1* | 3/2005 | Stojanovic | 375/371 |
| 2005/0134305 A1* | 6/2005 | Stojanovic et al. | 326/31 |
| 2005/0157780 A1* | 7/2005 | Werner et al. | 375/232 |
| 2005/0180536 A1* | 8/2005 | Payne et al. | 375/354 |
| 2005/0186920 A1* | 8/2005 | Staszewski et al. | 455/114.1 |
| 2005/0259764 A1* | 11/2005 | Hung Lai et al. | 375/317 |
| 2005/0271137 A1* | 12/2005 | Kolze et al. | 375/233 |
| 2005/0285647 A1* | 12/2005 | Wilson et al. | 327/172 |
| 2006/0140318 A1* | 6/2006 | Farjad-rad | 375/355 |
| 2006/0158225 A1* | 7/2006 | Stojanovic et al. | 326/87 |
| 2006/0280272 A1* | 12/2006 | Stojanovic | 375/355 |
| 2006/0291541 A1* | 12/2006 | Durand et al. | 375/147 |
| 2007/0019016 A1* | 1/2007 | Silverbrook et al. | 347/13 |
| 2007/0036256 A1* | 2/2007 | Yamaguchi et al. | 375/371 |
| 2007/0080718 A1* | 4/2007 | Stojanovic et al. | 326/87 |
| 2007/0253475 A1* | 11/2007 | Palmer | 375/229 |
| 2010/0220828 A1* | 9/2010 | Fuller et al. | 375/355 |
| 2011/0072296 A1* | 3/2011 | Nakayama et al. | 713/401 |
| 2011/0239030 A1* | 9/2011 | Ware et al. | 713/400 |
| 2011/0280109 A1* | 11/2011 | Raymond | 368/46 |
| 2012/0128036 A1* | 5/2012 | Kang et al. | 375/144 |

OTHER PUBLICATIONS

EP Extended Search Report dated May 4, 2011 re EP Application No. 08859802.4. 12 pages.

EP Response dated Nov. 25, 2011 to the Official Communications dated May 4, 2011 and May 23, 2011 for EP Application No. 08859802.4. 7 pages.

Preliminary Report on Patentability (Chapter I) with mail date of Jun. 17, 2010 re Int'l Application No. PCT/US2008/085240. 7 pages.

* cited by examiner

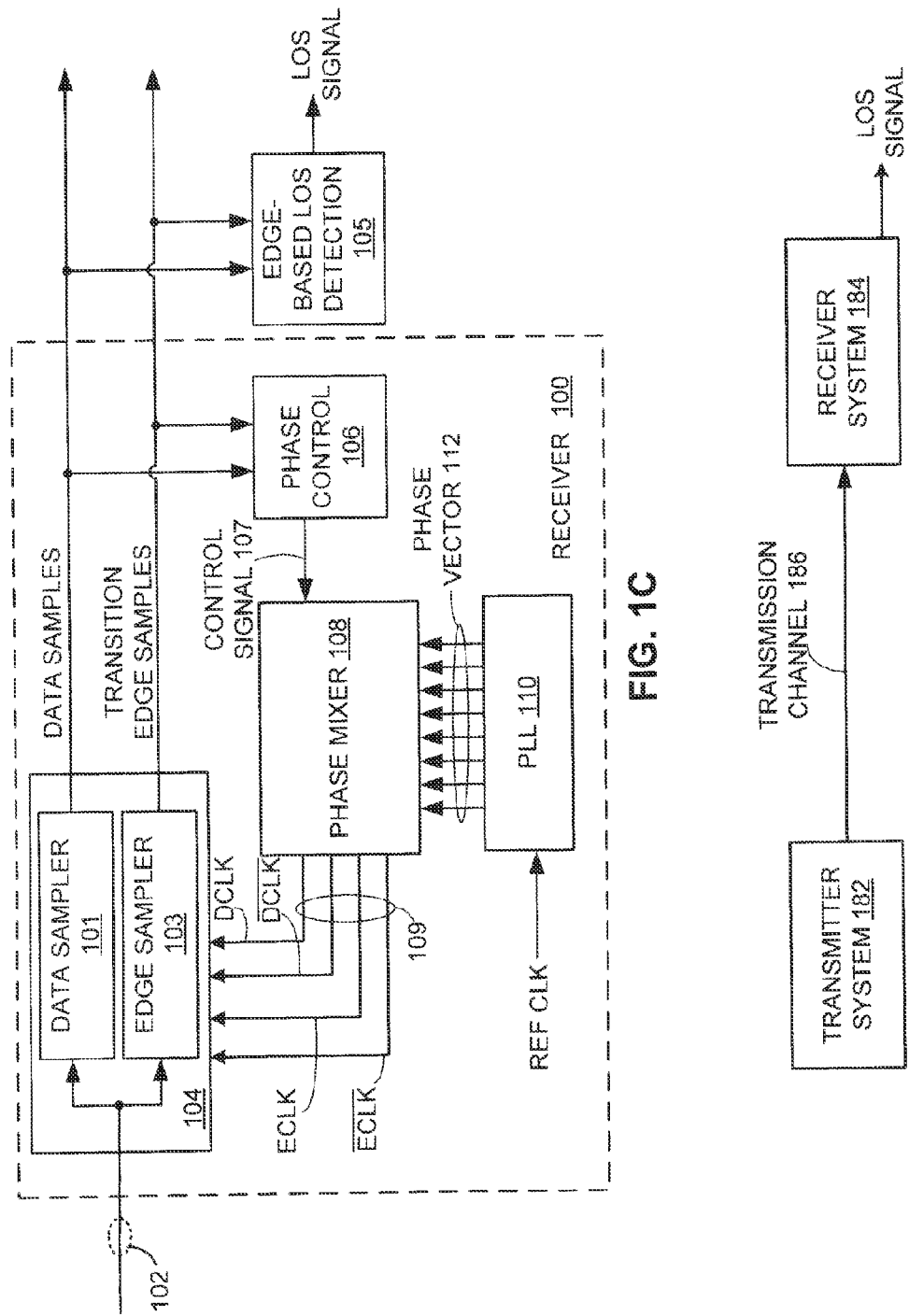

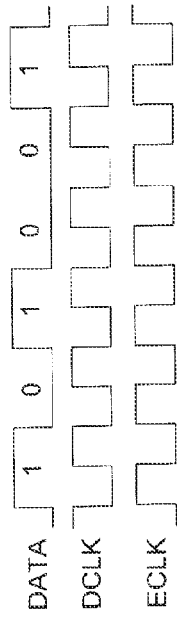
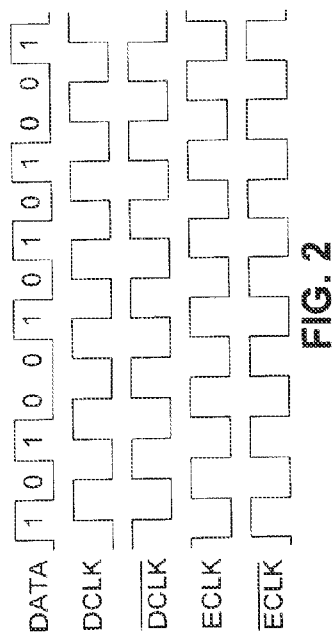
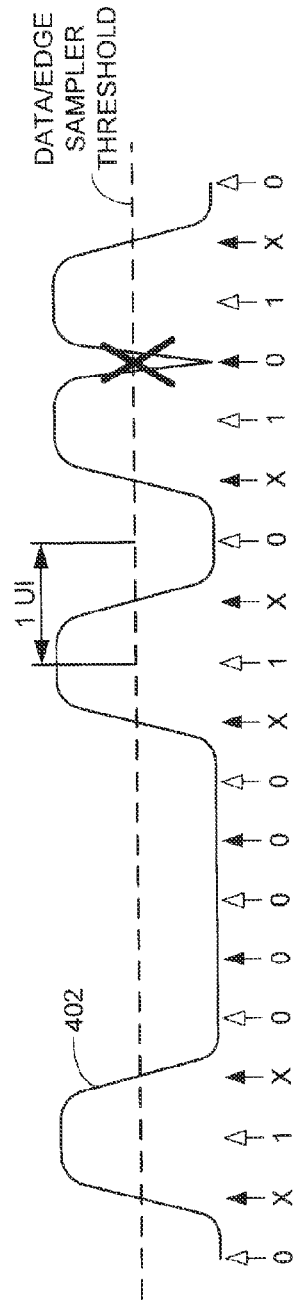
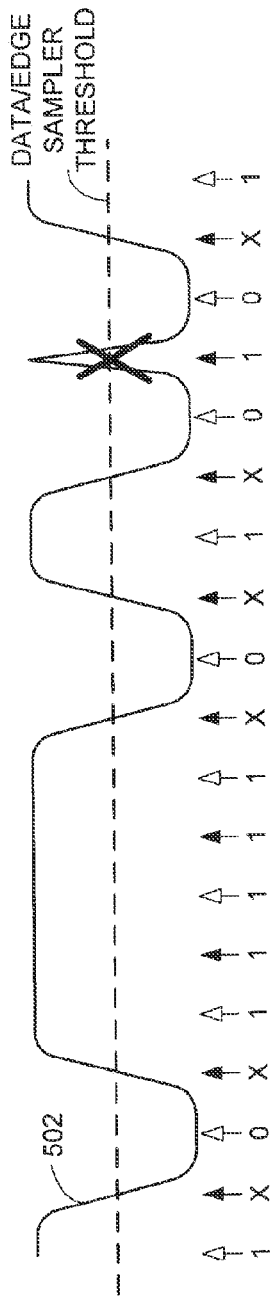

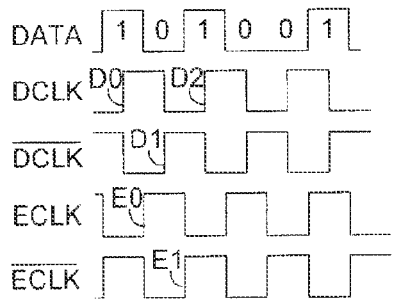
FIG. 6
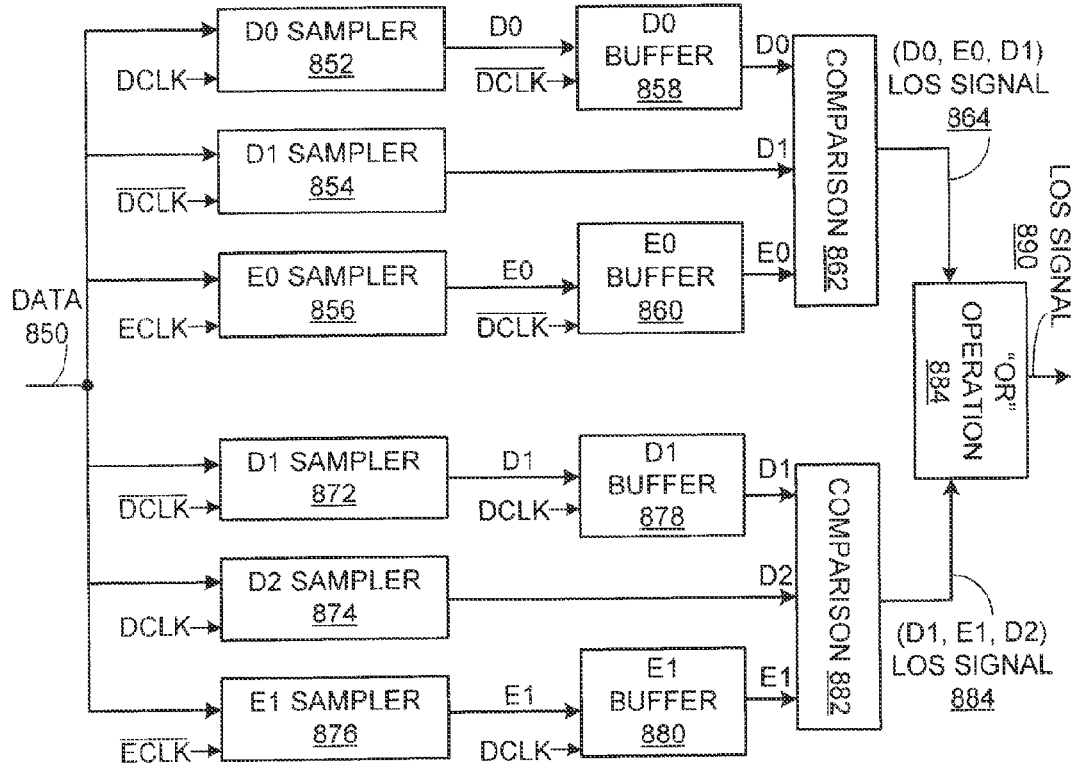
FIG. 7
FIG. 8A

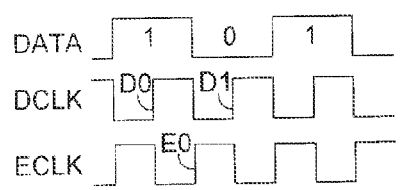
FIG. 9
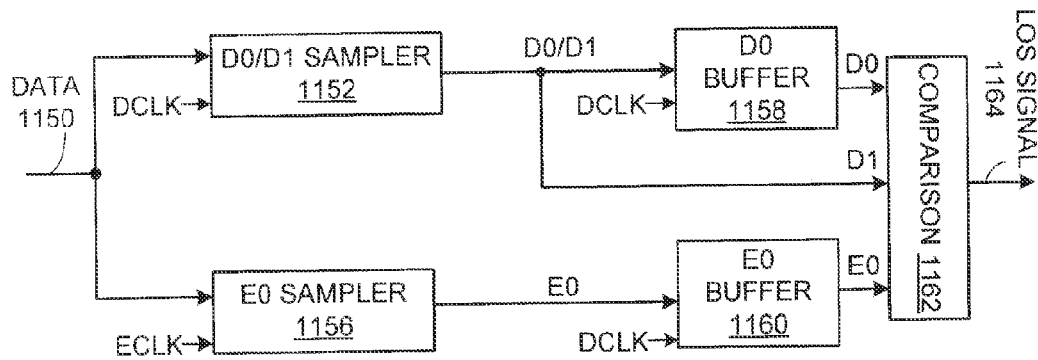
FIG. 10
FIG. 11A
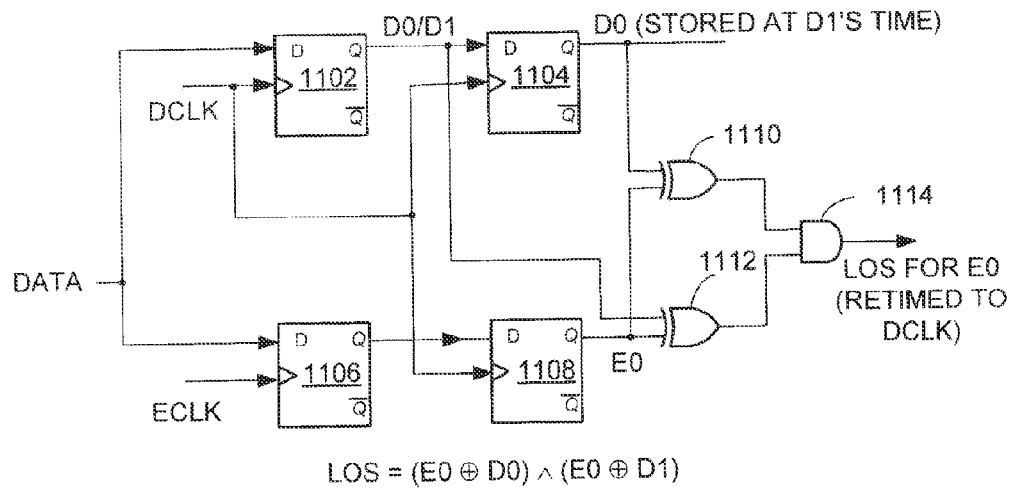
LOS = (E0 ⊕ D0) ∧ (E0 ⊕ D1)
FIG. 11B

US 8,509,094 B2

EDGE-BASED LOSS-OF-SIGNAL DETECTION

BACKGROUND

The present disclosure relates generally to the field of communications, and more particularly to high-speed electronic signaling within and between integrated circuit devices.

In modern electronic systems, the ability to detect the loss of an incoming signal (loss-of-signal, LOS) is often a system requirement. Even in systems where LOS detection is not required, it is often beneficial to be able to determine whether a usable incoming signal is being received. Some electronic systems have one or more power-saving modes which may be activated upon the detection of LOS. Conventional LOS detection mechanisms, however, often consume a considerable amount of power, thereby mitigating the benefit of various power-saving mechanisms. Furthermore, conventional LOS detection mechanisms only detect signal power but cannot determine whether a received data signal is at a usable data rate.

BRIEF DESCRIPTION OF THE FIGURES

The disclosure herein is illustrated by way of example, and not by way of limitation, in the figures of the accompanying drawings and in which like reference numerals refer to similar elements and in which:

FIG. 1C illustrates a receiver 100 operating in conjunction with an edge-based LOS detection module 105.

FIG. 1D illustrates an exemplary system that includes a transmitter system and a receiver system capable of edge-based LOS detection.

FIG. 2 illustrates an exemplary timing diagram of a data signal and a set of clock signals in a double-data-rate (DDR) configuration.

FIG. 3 illustrates an exemplary timing diagram of a data signal and a set of clock signals in a single-data-rate (SDR) configuration.

FIG. 4 illustrates detection of an exemplary edge glitch that occurs between two "1" data bits.

FIG. 5 illustrates detection an exemplary edge glitch that occurs between two "0" data bits.

FIG. 6 illustrates a timing diagram for the data and edge samplers for edge-based LOS detection in a DDR configuration.

FIG. 7 presents two truth tables 702 and 704 for generating an LOS signal in a DDR configuration.

FIG. 8A illustrates an exemplary block diagram for a circuit that generates an LOS signal based on the truth tables in FIG. 7.

FIG. 9 illustrates a timing diagram for the data and edge samplers for edge-based LOS detection in an SDR configuration.

FIG. 10 presents a truth table 1002 for generating an LOS signal in an SDR configuration.

FIG. 11A illustrates an exemplary block diagram for a circuit that generates an LOS signal based on the truth table in FIG. 10.

FIG. 11B illustrates an exemplary circuit for generating an LOS signal in an SDR configuration.

Figure 1A:
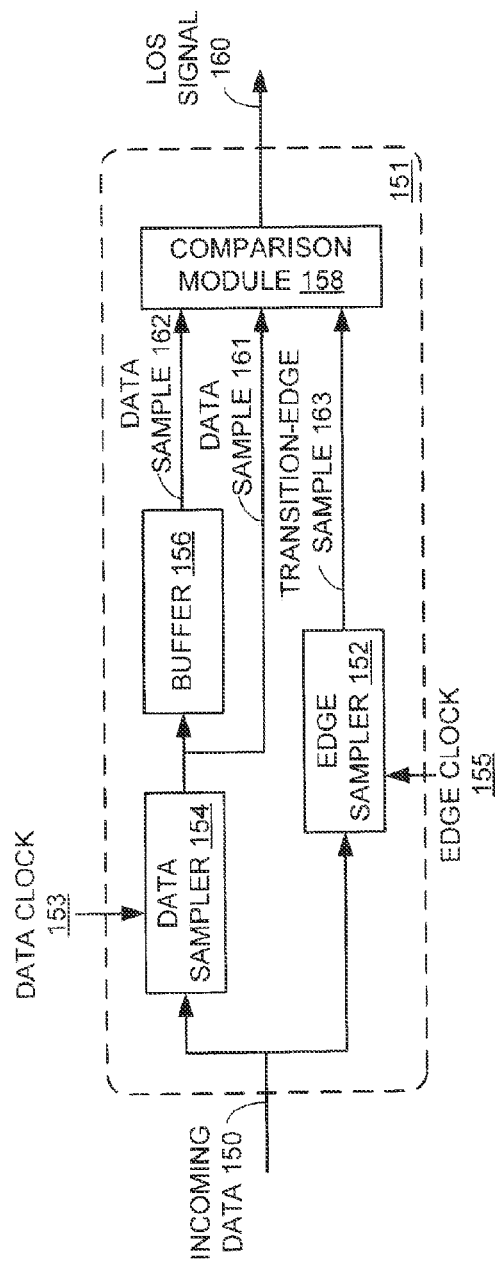
FIG. 1A illustrates an exemplary architecture of an edge-based LOS detector 151 implemented in hardware.

In the drawings, the same reference numbers identify identical or substantially similar elements or acts. The most significant digit or digits in a reference number refer to the figure number in which that element is first introduced. For example, element 100 is first introduced in and discussed in conjunction with FIG. 1C.

DETAILED DESCRIPTION

The following description is presented to enable any person skilled in the art to make and use embodiments disclosed herein, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the disclosure.

Many signaling standards as well as non-standard applications require receivers to detect LOS. LOS detection not only ensures proper operation of the receiver, but also can allow receivers to power down when not receiving data, which is a desirable feature since power efficiency is becoming an ever-growing driving force in the I/O industry. However, conventional LOS detection circuits tend to be analog circuits that consume a large amount of power, which can significantly offset the power-efficiency benefits of intermittent receiver shutdown. Furthermore, conventional approaches merely verify signal swing, but not signal validity.

Embodiments of the present invention provide a mechanism for edge-based LOS detection, which obviates direct voltage measurement by using logic gates or software-based logical determination. In addition, the present LOS detection mechanism can detect not only LOS with respect to loss of power, but also unusable data due to, for example, mismatched data rate.

In one embodiment, the LOS detection mechanism is based on an observation of valid data signals to which the receiver's clock and data recovery (CDR) circuit has been locked. After the CDR circuit has locked to a received data pattern, the timing placement of edge samplers falls approximately on data transition edges and can be used to measure the logical values at these transition edges. During normal operation with a valid signal present at the receiver inputs, an edge sampler normally does not observe a logical transition edge value that is different from two adjacent data samples of equal logical values, assuming that the voltage threshold of the edge sampler is set properly (e.g., at the mid-point between the high and low voltage levels for the data bits). That is, the edge sampler typically does not detect a "1" transition edge value if both the prior and subsequent data bits are "0"s, or a "0" transition edge value if both the prior and subsequent data bits are "1"s. Note that, in the present description, a "transition edge" refers to the point that substantially delineates two consecutive data bits. An edge sampler ideally samples at the transition edge between two consecutive data bits, although there might not be an actual edge at that point if the two data bits are of the same value.

Therefore, in a valid CDR-locked data signal, an occurrence of an "unlike" transition edge sample between two "like" data samples is considered to be an "edge glitch," and can be used to detect LOS. In normal operation, two consecutive "like" data samples typically mean that the voltage at the transition edge sampling point between these two data bits is approximately at the DC voltage level for the corresponding logical value (assuming the data bits are encoded in a non-return-to-zero, or NRZ, format). In other words, the voltage level at the transition edge between two equal data bits (which during normal operation is not an actual edge) is expected to be so far from the switching threshold of the edge sampler that an edge glitch would not occur when the receiver is receiving valid data signals. As corroborated by lab testing, such an edge glitch is rarely or never observed so long as the data signals are normal and the CDR remains locked.

In an LOS situation (the transmitter is de-coupled from the receiver, the transmitter sends out NULL data bits, etc.) the data and edge sampler outputs at the receiver are most likely to be determined by the thermal noise and the sampler threshold. If the sampler's threshold is approximately at the center of the thermal noise voltage range, the data and edge samplers would produce uncorrelated, random patterns of "0"s and "1"s. In such a random, uncorrelated signal stream, with substantially equal occurrences of "0"s and "1"s, there will be a high occurrence rate (e.g., 25% of all edge samples) of edge glitches. Even if the sampler threshold exhibits an offset from the ideal position (i.e., away from the mid-point of the thermal noise voltage range), so long as the threshold is within the thermal noise range, the edge glitches still occur with some probability.

In one embodiment, the edge-based LOS detection mechanism can use the outputs of the data and edge samplers included in the CDR circuitry. As a result, the edge-based LOS detection mechanism can avoid significant additional power consumption in the receiver. Note that the edge-based LOS detection mechanism can also be implemented in software. For example, the edge-based LOS detection mechanism can be coded as part of the middleware residing above the physical layer and determine whether LOS has occurred based on the data and transition edge values provided by the receiver.

FIG. 1A illustrates an exemplary architecture of an edge-based LOS detector 151 implemented in hardware. In one embodiment, edge-based LOS detector 151 receives an incoming data signal 150, a data clock 153, and an edge clock 155, and produces an LOS signal 160. Edge-based LOS detector 151 includes a data sampler 154, which produces a data sample 161, a buffer 156, which produces a data sample 162, an edge sampler 152, which produces a transition edge sample 163, and a comparison module 158.

During operation, data sampler 154 is triggered by data clock 153, samples incoming data signal 150, and produces a stream of data samples. The output of data sampler 154, data sample 161, is then delayed for one unit interval by buffer 156 and becomes data sample 162. Buffer 156 allows the system to compare two consecutive data bit values. Note that buffer 156 may be timed by data clock 153 or a separate clock signal.

Edge sampler 152, which is triggered by edge clock 155, samples incoming data signal 150 and produces a stream of transition edge samples. Note that the value of a transition edge sample value is the logical value sampled at the delineation point between two adjacent data bits.

Transition edge sample 163, data sample 162, and data sample 161 are fed into comparison module 158, which determines whether an edge glitch has occurred. Based on this determination, comparison module 158 generates LOS signal 160. In some embodiments, generation of LOS signal 160 is based on the count of edge glitches. In further embodiments, LOS signal 160 can be implemented as a "sticky bit" that is set every time an edge glitch is detected.

Note that data clock 153 and edge clock 155 are not necessarily generated by a local CDR circuit. For example, data clock 153 may be distributed to the receiver from the transmitter in synchronous communications. Edge clock 155 can be derived from the provided data clock 153. Furthermore, data sampler 154, buffer 156, and edge sampler 152 may be part of the receiver circuitry. Therefore, edge-based LOS detector 151 may not need to include these components and can share these data and edge samples with the receiver circuitry. Additionally, edge-based LOS detector 151 can reside within or outside the receiver chip.

Figure 1B:
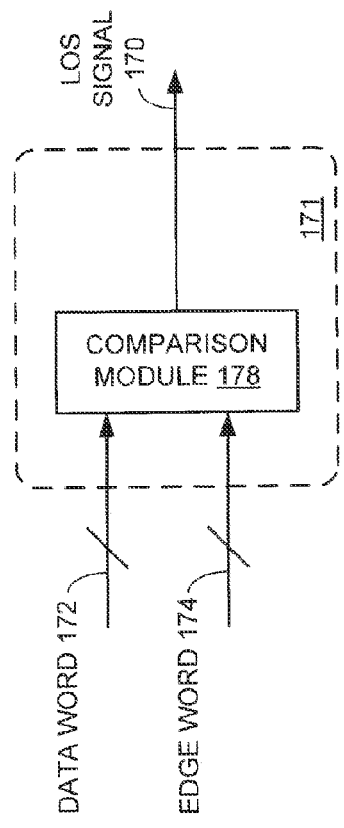
FIG. 1B illustrates an exemplary architecture of an edge-based LOS detector implemented in software.

An edge-based LOS detector can also reside in the logical layer and does not require any specialized hardware. FIG. 1B illustrates an exemplary architecture of an edge-based LOS detector implemented in software. An edge-based LOS detector module 171 includes a comparison module 178. During operation, comparison module 178 receives a data word 172 and an edge word 174, which are provided by the receiver. Note that data word 172 typically contains a number (e.g., 8) of consecutive bits recovered from the received data signal. Edge word 174 contains a number of bits representing values sampled at the transition edges between the corresponding adjacent data bits. Comparison module 178 then compares a respective transition edge value with the two adjacent data values and generates an LOS signal 170 accordingly. Edge-based LOS detector 171 can be entirely or partially implemented in the middleware. In one embodiment, edge-based LOS detector 171 is coded as a program stored in a programmable field logic array (FPGA) chip. Other forms of storage are also possible.

FIG. 1C illustrates a receiver 100 operating in conjunction with an edge-based LOS detection module 105. Receiver 100 includes a receive port 102, a sampler circuit 104, a phase control module 106, a phase mixer 108 which produces a set of clock signals 109, and a phase-locked-loop (PLL) 110 which outputs one or more phase vectors 112. Sampler circuit 104 includes a data sampler 101 and an edge sampler 103. An edge-based LOS detection module 105 is coupled to the outputs of data sampler 101 and edge sampler 103. In this example, receiver 100 is assumed to be operating in a double-data-rate (DDR) configuration, where one data bit (or a unit interval, UI) occupies half a clock cycle.

In one embodiment, sampler circuit 104, phase control module 106, phase mixer 108, and PLL 110 form a CDR circuit. During operation, based on a reference clock signal, PLL 110 outputs a set of clock signals, referred to as phase vector 112, to phase mixer 108. Each component clock signal in phase vector 112 is offset from one another by successive 45-degree increments such that, when an arbitrary component clock signal is considered to be at a zero-degree phase, the remaining seven component clock signals have phase angles of 45, 90, 135, 180, 225, 270, and 315 degrees. Note that the aforementioned configuration for receiver 100 is only for illustration purposes only. Receiver 100 can employ various architectures. For example, instead of PLL 110, receiver 100 can use a delay-lock loop (DLL). Furthermore, phase vector 112 can include other numbers (e.g., 4, 12, or 16) of components which are separated by different angles. Other types of CDR circuits can also be used in place of phase mixer 108 and PLL 110. In some embodiments, receiver 100 may have externally provided clock signals and may not need a CDR circuit.

Phase mixer 108 selects and interpolates between a pair of component clock signals based on a phase count value (determined by phase control module 106) to produce four recovered clock signals 109, namely data clock (DCLK), inverted data clock (/DCLK), edge clock (ECLK), and inverted edge clock (/ECLK). With these four clock signals serving as triggers, data sampler 101 and edge sampler 103 within sampler circuit 104 can sample consecutive data bits and corresponding transition edges in the incoming DDR data stream.

The outputs of sampler circuit 104 are coupled to phase control module 106, which receives the data and transition edge samples captured by sampler circuit 104. Phase control module 106 compares these samples with one another to determine whether edges of the recovered clock signals 109 occur early or late relative to the transitions in the incoming data signal. Based on this early/late information, phase control module 106 outputs a control signal 107 to phase mixer 108 which responds by increasing or decreasing the phase count value and thereby delaying or advancing the phase of the recovered clock signals 109. Eventually, the receiver reaches a phase-locked condition where the recovered clock signals exhibit a desired phase in relation to the incoming data signals (e.g., the rising edges of DCLK and /DCLK are aligned with the mid-points of data bit intervals). After reaching the phase-locked condition, phase control module 106 toggles the control signal to phase mixer 108 between advancing and delaying the phase of the recovered clock signals 109.

In one embodiment, the outputs of data sampler 101 and edge sampler 103 are coupled to edge-based LOS detection module 105. Edge-based LOS detection module 105 detects edge glitches based on the data and transition edge samples captured by sampler circuit 104, and generates an LOS signal based on the detected edge glitches. In one embodiment, edge-based LOS detection module 105 can share some of the logic gate circuitry with phase control module 106, since both modules perform logical functions on the same stream of data and edge samples. Furthermore, edge-based LOS detection module 105 can include one or more edge-glitch counters and can generate LOS signals based on the number of edge glitches and/or a percentage of edge glitches with respect to the total number of transition edge samples that can potentially be edge glitches (i.e., an "unlike" transition edge sample between two "like" data samples).

FIG. 1D illustrates an exemplary system that includes a transmitter system and a receiver system capable of edge-based LOS detection. In this example, a transmitter system 182 is in communication with a receiver system 184 over a transmission channel 186. In one example, receiver system 184 includes a receiver circuit 100 and an edge-based LOS detection module 105. During operation, edge-based LOS detection module 105 can generate an LOS signal when an occurrence of an edge glitch is detected. Other configurations for receiver system 184 to facilitate edge-based LOS detection are also possible.

The example illustrated in FIG. 1C is based on a DDR configuration. FIG. 2 illustrates an exemplary timing diagram of a data signal and a set of clock signals in a DDR configuration. As illustrated in FIG. 2, each data bit occupies half a clock cycle. The rising edges in two data clocks, DCLK and /DCLK, substantially coincide with the midpoints of two consecutive data bits and therefore can be used to sample the incoming data stream. Similarly, the rising edges of the two edge clocks, ECLK and /ECLK, substantially coincide with two consecutive transition edges and can be used to sample the transition edges continuously.

The present edge-based LOS detection mechanism is applicable not only in a DDR receiver, but also in signal-data-rate (SDR) receivers where a data bit occupies one clock cycle. FIG. 3 illustrates an exemplary timing diagram of a data signal and a set of clock signals in an SDR configuration. As illustrated in FIG. 3, each data bit occupies one clock cycle. The rising edge of data clock DCLK is substantially at the midpoint of a data bit, and can be used to sample consecutive data bits. Similarly, the rising edge of an edge clock, ECLK, which in one embodiment exhibits a 180-degree phase offset from DCLK, can be used to sample consecutive transition edges. Note that if DCLK has a 50% duty cycle, the inverted DCLK, /DCLK, can serve as ECLK.

Edge-Based LOS Detection

In some embodiments, the system detects LOS by detecting edge glitches which occur between two consecutive data bits with the same logical value. FIG. 4 illustrates detection of an exemplary edge glitch that occurs between two "1" data bits. An incoming data stream 402 is sampled by data samplers and edge samplers. The sample points are indicated by arrows, wherein an unfilled arrow represents a data sample and a solid arrow represents a transition edge sample. Each data bit occupies one UI. The data samples and transition edge samples are interleaved, such that all samples are spaced at ½ UI.

In the example in FIG. 4, the voltage threshold used by the data and edge samplers (or a pair of data samplers and a pair of edge samplers in a DDR configuration) is substantially at the data transition edge crossing point. Note that, although not shown in FIG. 4, this data transition edge crossing point can be observed on an eye diagram.

When the data stream transitions from "1" to "0," or from "0" to "1," the logical value sampled at the corresponding transition edge depends primarily on whether the edge clock is early or late and is typically undetermined (represented by an "x" in FIG. 4). This early/late information can be used by the CDR to adjust the phase of the recovered clock signals. For example, a data-edge-data sample stream of "001" can indicate an early clock, and a data-edge-data sample stream of "100" can indicate a late clock. However, as illustrated in FIG. 4, when two consecutive data bits are both "1" and the transition edge sample between them exhibits a logical value of "0," an edge glitch has occurred. Such an edge glitch normally would not occur because the transmitter does not transmit a spike of "0" between two "1"s. Hence, an edge glitch can be a fairly reliable indication that there is an LOS. Note that the LOS detection mechanism can immediately generate an LOS signal based on one occurrence of an edge glitch or can use a statistical approach and generate an LOS signal based on the number of detected edge glitches. Furthermore, the example illustrated in FIG. 4 is not specific to DDR or SDR operation.

FIG. 5 illustrates detection of an exemplary edge glitch that occurs between two "0" data bits. An incoming data stream 502 is sampled by data and edge samplers. When two consecutive "0" data bits are detected and the transition edge sample between them exhibits a logical value of "1," an edge glitch occurs. The system can then generate an LOS signal accordingly. Note that the examples in FIG. 4 and FIG. 5 are based on the assumption that the data and edge samplers are phase-locked to the incoming signal.

Note that the examples described herein are not specific to either single-ended or differential signaling.

The following description teaches exemplary circuit implementations for edge-based LOS detection in both DDR and SDR configurations. FIGS. 6-8 illustrate an exemplary circuit in a DDR configuration, and FIGS. 9-11 illustrate an exemplary circuit in an SDR configuration. Note that embodiments of the present invention are not limited to these examples. Other implementations in hardware, software, or a combination of hardware and software are also possible.

FIG. 6 illustrates a timing diagram for the data and edge samplers for edge-based LOS detection in a DDR configuration. The four recovered clock signals, DCLK, /DCLK, ECLK, and /ECLK, provide four rising edges for detecting edge glitches at two consecutive transition edges. Note that three sampling clocks (two data clocks and one edge clock) are used to detect the occurrence of one edge glitch. Hence, DCLK, ECLK, and /DCLK provide three sampling rising edges, D0, E0, and D1, to sample the two corresponding data bits and the transition edge between them. For the transition edge immediately following D1, /DCLK, /ECLK, and DCLK provide another three sampling rising edges, D1, E1, and D2. Note that DCLK provides both D0 and D2. However, D0 and D2 are to be used separately, one in conjunction with E0/D1 and the other with E1/D2, respectively, to detect glitches in two consecutive transition edges.

FIG. 7 presents two truth tables 702 and 704 for generating an LOS signal in a DDR configuration. Truth table 702 indicates when the LOS signal is set, or when an edge glitch is detected, based on the logical values sampled at D0, E0, and D1. Specifically, when D0 and D1 are logical "1"s and E0 is logical "0," an edge glitch is detected and LOS is set to "1" (or logical "true"). When D0 and D1 are logical "0"s and E0 is logical "1," an edge glitch is also detected and LOS is set to "1" as well. When D0, E0, and D1 all exhibit the same logical value, LOS is set to "0," because there is no edge glitch. When D0 and D1 exhibit different logical values, LOS is also set to "0," because the system cannot distinguish the edge value from a random value that would have been produced by sampling in the middle of a transition edge.

Note that, when D0 and D1 exhibit different values, the CDR circuit can derive phase information of the clock signals based on the logical values of D0/E0/D1. For example, when D0/E0/D1 are of the values "001" or "110," the clock signals are early, because E0 exhibits the same value as D0 instead of D1. On the other hand, when D0/E0/D1 are of the values "011" or "100," the clock signals are late, because E0 exhibits the same value as D1 instead of D0. Moreover, in one embodiment, the data and transition edge sampling functions required for LOS detection can be derived from the CDR circuit. That is, D0, E0, and D1 values are provided by the CDR circuit, and LOS signal generation can be based on proper logical combination of these signals without the necessity for separate data and transition edge samplers.

Similarly, truth table 704 indicates when the LOS signal is set based on the logical values detected at D1, E1, and D2. Specifically, when D1 and D2 are logical "1"s and when E1 is logical "0," an edge glitch is detected and LOS is set to "1." When D1 and D2 are logical "0"s and E1 is logical "1," an edge glitch is also detected and LOS is set to "1" as well. When D1, E1, and D2 all exhibit the same logical value, LOS is set to "0," because there is no edge glitch. When D2 and D1 exhibit different logical values, LOS is also set to "0" because the system cannot distinguish the edge value from a random value that would have been produced by sampling in the middle of a transition edge. The values of D1/E2/D2 can also be used to determine the phase information of the four clock signals by the CDR circuit. In one embodiment, D1, E2, and D2 are included in and are provided by the CDR circuit.

FIG. 8A illustrates an exemplary block diagram for a circuit that generates an LOS signal based on the truth tables in FIG. 7. This circuit includes a D0 sampler 852, a D1 sampler 854, an E0 sampler 856, a D0 buffer 858, an E0 buffer 860, and a comparison module 862, which jointly sample an incoming data signal 850 and produce an LOS signal 864. Note that LOS signal 864 corresponds to the LOS signal value in truth table 702, and is referred to as "(D0, E0, D1) LOS signal 864" in FIG. 8A.

Similarly, the circuit also includes a D1 sampler 872, a D2 sampler 874, an E1 sampler 876, a D1 buffer 878, an E1 buffer 880, and a comparison module 882, which jointly sample data signal 850 and produce an LOS signal 884. LOS signal 884 corresponds to the LOS signal value in truth table 704, and is referred to as "(D1, E1, D2) LOS signal 884."

During operation, D0 sampler 852, which is triggered by the rising edge of DCLK, produces D0. Similarly, D1 sampler 854, which is triggered by the rising edge of /DCLK, produces D1, and E0 sampler 856, which is triggered by the rising edge of ECLK, produces E0. Since these three samplers are triggered at different times, their outputs are ideally re-timed so that the system can properly compare their corresponding values. Hence, D0 buffer 858 re-times D0 to /DCLK, and E0 buffer 860 re-times E0 to /DCLK as well. Comparison module 862 then compares the values of D0, D1, and E0, which are all timed to /DCLK, and determines whether an edge glitch has occurred. If an edge glitch has occurred, comparison module 862 asserts (D0, E0, D1) LOS signal 864.

Similarly, D2 sampler 874 produces D2, which is timed to DCLK. D1 sampler 872 and D1 buffer 878 jointly produce D1, and E1 sampler 876 and E1 buffer 880 jointly produce E1, wherein both D1 and E1 are re-timed to DCLK. Comparison module 882 then compares D1, D2, and E1, which are all timed to DCLK, and determines whether an edge glitch has occurred, in which case (D1, E1, D2) LOS signal 884 would be asserted.

An "OR" operation module 884 asserts an LOS signal 890 when either (D0, E0, D1) LOS signal 864 or (D1, E1, D2) LOS signal 884 is asserted.

Figure 8B:
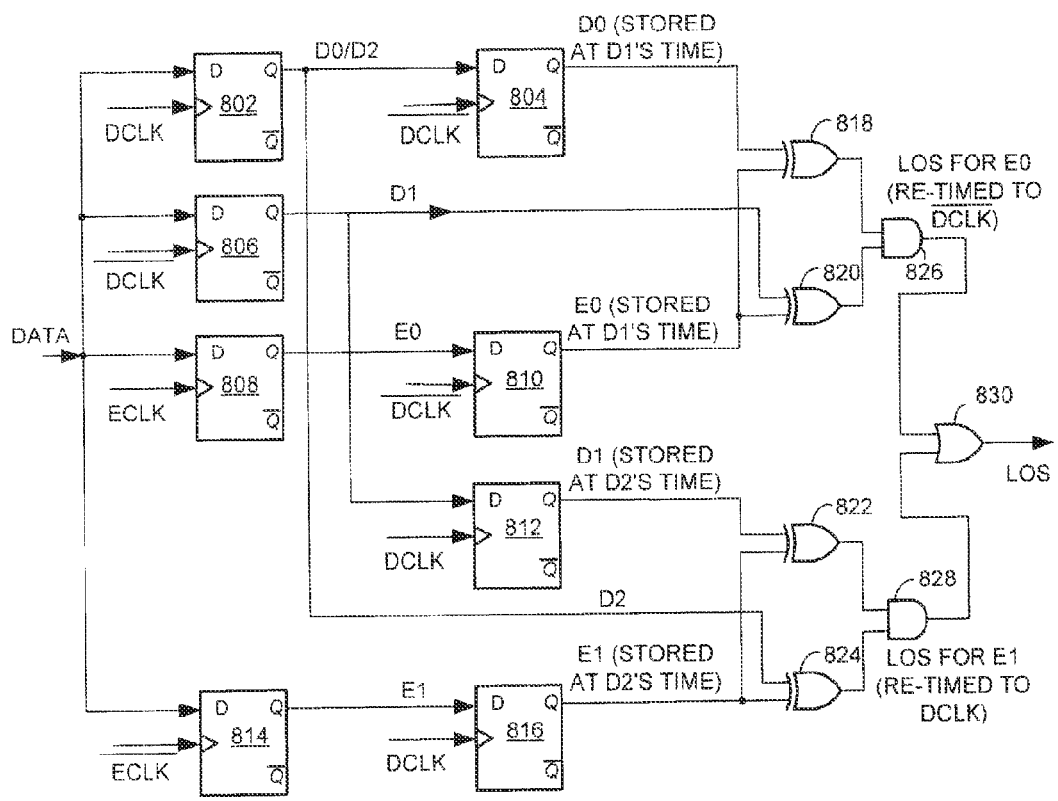
FIG. 8B illustrates an exemplary circuit for generating an LOS signal in a DDR configuration.

FIG. 8B illustrates an exemplary circuit for generating an LOS signal in a DDR configuration. In this example, eight flip-flops 802, 804, 806, 808, 810, 812, 814, and 816, triggered by different clock signals, sample the data bits or transition edges. This circuit further includes XOR gates 818, 820, 822, and 824, AND gates 826 and 828, and OR gate 830, which in combination generate the LOS signal. In one embodiment, based on truth tables 702 and 704, the logical value for LOS can be expressed as the following Boolean expression:

$$LOS = [(E0 \oplus D0 \wedge (E0 \oplus D1)] \vee [(E1 \oplus D1 \wedge (E1 \oplus D2)];$$

where "$\oplus$" indicates the XOR operation, "$\wedge$" indicates the AND operation, and "$\vee$" indicates the OR operation.

The first half of the LOS expression above, $[(E0 \oplus D0 \wedge (E0 \oplus D1)]$, corresponds to truth table 702 and is based on the logical values of D0, E0, and D1. The second half, $[(E1 \oplus D1 \wedge (E1 \oplus D2)]$, corresponds to truth table 704 and is based on the logical values of D1, E1, and D2. Note that an edge glitch can occur at either E0 or E1. Therefore, these two expressions can be joined by an OR operation to produce the LOS signal.

To accurately evaluate the expressions above, a respective group of data/transition edge samples (i.e., D0/E0/D1 or D1/E1/D2) are ideally re-timed with the same clock signal. As illustrated in FIG. 8, flip-flop 802, which is triggered by DCLK, first captures the logical value at D0. This logical value is then stored by flip-flop 804 which is triggered by /DCLK. As a result, the output of flip-flop 804 is the logical value of D0 stored at D1's time. Similarly, flip-flop 808, which is triggered by ECLK, captures the logical value at E0. This logical value is then stored by flip-flop 810 which is triggered by /DCLK. As a result, the output of flip-flop 810 is the logical value of E0 stored at D1's time. Similarly, flip-flop 806, which is triggered by /DCLK, captures the logical value of D1.

XOR gate 818 produces the value of E0⊕D0, and XOR gate 820 produces the value of E0⊕D1. AND gate 826 produces the value of expression [(E0⊕D0 ∧ (E0⊕D1)], which indicates whether an edge glitch has occurred at E0. Note that the CDR circuit can also use the outputs of XOR gates 818 and 820 to determine phase information of the clock signals. For example, if XOR gate 818 outputs a "0" and XOR gate 820 outputs a "1," which means E0 is equal to D0 and opposite to D1, the clock signals are expected to be early with respect to the data signals. On the other hand, if XOR gate 818 outputs a "1" and XOR gate 820 outputs a "0," the clock signals are expected to be late. In one embodiment, the outputs of XOR gates 818 and 820 may be provided by the CDR circuit, which can obviate the need for flip-flops 802, 804, 806, 808, and 810.

Similarly, flip-flops 802, 806, 812, 814, and 816 provide the samples at D1, E1, and D2. Flip-flop 806, which is triggered by /DCLK, captures the logical value at D1. This logical value is then captured by flip-flop 812 which is triggered by DCLK. As a result, the output of flip-flop 812 is the logical value of D1 stored at D2's time. Flip-flop 814, triggered by /ECLK, captures the logical value at E1. This logical value is then captured by flip-flop 816 which is triggered by DCLK. As a result, the output of flip-flop 816 is the logical value of E1 stored at D2's time. Furthermore, flip-flop 802, which is triggered by DCLK, captures the logical value at D2.

XOR gate 822 provides the value of E1⊕D1, and XOR gate 824 provides the value of E1⊕D2. AND gate 828 provides the value of expression [(E1⊕D1 ∧ (E1⊕D2)], which indicates whether an edge glitch has occurred at E1. Note that the CDR circuit can also use the outputs of XOR gates 822 and 824 to determine phase information of the clock signals. In one embodiment, the outputs of XOR gates 822 and 824 may be provided by the CDR circuit, which can obviate the need for flip-flops 802, 806, 812, 814, and 816.

The output of AND gate 826 indicates whether an edge glitch has occurred at E0, and its output is re-timed to /DCLK. Similarly, output of AND gate 828 indicates whether an edge glitch has occurred at E1, and its output is re-timed to DCLK. OR gate 830 generates the final LOS signal, which is set to "1" when either of the outputs of AND gates 826 and 828 is set to "1."

Note that in further embodiments, the outputs of AND gates 822 and 828 can be coupled to a counter that tracks the total number of edge glitches. This counter can be triggered by a rising edge in the output of either AND gate 822 or AND gate 828. The receiver system can then determine whether to issue an LOS alert based on the total number of detected edge glitches. In some embodiments, the receiver can set a threshold based on the percentage of edge glitches with respect to the total number of received bits, the total number of edge glitches detected within a certain period of time, or based on the percentage of edge glitches with respect to the total number of transition edge samples which can potentially be edge glitches (i.e., a transition edge sample between two "like" data samples). In some embodiments, the LOS detection mechanism can be configured to run intermittently, trading off bandwidth for reduced power consumption. Other LOS-alert-generation schemes are also possible.

FIG. 9 illustrates a timing diagram for the data and transition edge samplers for edge-based LOS detection in an SDR configuration. The two recovered clock signals, DCLK and ECLK, provide two rising edges for detecting edge glitches between two consecutive data bits. Specifically, DCLK provides sampling rising edges D0 and D1 to sample the two consecutive data bits, and ECLK provides the sampling rising edge E0 to sample the transition edge between these two data bits.

FIG. 10 presents a truth table 1002 for generating an LOS signal in an SDR configuration. Specifically, when D0 and D1 are logical "1"s and E0 is logical "0," an edge glitch is detected the LOS is set to "1" (or logical "true"). When D0 and D1 are logical "0"s and E0 is logical "1," and edge glitch is also detected and LOS is set to "1" as well. When D0, E0, and D1 all exhibit the same logical value, LOS is set to "0," because there is no edge glitch. When D0 and D1 exhibit different logical values, LOS is also set to "0," because the system cannot distinguish the edge value from a random value that would have been produced by sampling in the middle of a transition edge.

Note that, when D0 and D1 exhibit different values, the CDR circuit can derive phase information of the clock signals based on the logical values of D0/E0/D1. For example, when D0/E0/D1 are of the values "001" or "110," the clock signals are early, because E0 exhibits the same value as D0 instead of D1. On the other hand, when D0/E0/D1 are of the values "011" or "100," the clock signals are late, because E0 exhibits the same value as D1 instead of D0. Moreover, in one embodiment, the data and edge sampling functions are included in the CDR circuit. That is, D0, E0, and D1 values are provided by the CDR circuit, and LOS signal generation can be based on proper logical combination of these signals without using separate data and transition edge samplers.

FIG. 11A illustrates an exemplary block diagram for a circuit that generates an LOS signal based on the truth table in FIG. 10. This circuit includes a D0/D1 sampler 1152, a D0 buffer 1158, an E0 sampler 1156, an E0 buffer 1160, and a comparison module 1162, which jointly sample an incoming data signal 1150 and produce an LOS signal 1164. Note that LOS signal 1164 corresponds to the LOS signal value in truth table 1002.

During operation, D0/D1 sampler 1152, which is triggered by the rising edge of DCLK, produces D0 and D1, where D1 lags D1 by one UI. Similarly, EU sampler 1156, which is triggered by the rising edge of ECLK, produces EU. Since D0, D1, and E0 are sampled at different times, these three samples are ideally re-timed so that the system can properly compare their corresponding values. Hence, D0 buffer 1158 re-times D0 to DCLK. That is, D0 buffer 1158 buffers D0 for one UI so that D0 can be aligned in time with D1. Similarly, E0 buffer 1160 re-times E0 to DCLK, so that E0 is also aligned in time with D1. Comparison module 1162 then compares the values of D0, D1, and E0, which are all timed to DCLK, and determines whether an edge glitch has occurred. If an edge glitch has occurred, comparison module 1162 asserts LOS signal 1164.

FIG. 11B illustrates an exemplary circuit for generating an LOS signal in an SDR configuration. In this example, four flip-flops 1102, 1104, 1106, and 1108, triggered by different clock signals, sample the data bits or transition edges. This circuit further includes XOR gates 1110 and 1112, and AND gate 1114, which in combination generate the LOS signal. In one embodiment, based on truth table 1002, the logical value for LOS can be expressed as the following Boolean expression:

$$LOS = (E0 \oplus D0) \wedge (E0 \oplus D1)$$

To accurately evaluate the expressions above, the data and transition edge samples (i.e., D0/E0/D1) are ideally re-timed with the same clock signal. In one embodiment, these samples are re-timed to the rising edge of D1. As illustrated in FIG. 11B, flip-flop 1102, which is triggered by DCLK, first captures the logical value at D0. This logical value is then stored by flip-flop 1104 which is also triggered by DCLK. Note that after the rising edge of D1, the output of flip-flop 1102 stores the logical value of D1, and the output of flip-flop 1104 stores the logical value of D0. Similarly, flip-flop 1106, which is triggered by ECLK, captures the logical value at E0. This logical value is then stored by flip-flop 1108 which is triggered by DCLK. As a result, the output of flip-flop 1108 is the logical value of E0 stored at D1's time.

XOR gate 1110 produces the value of E0⊕D0, and XOR gate 1112 produces the value of E0⊕D1. AND gate 826 produces the value of expression [(E0⊕D0)∧(E0⊕D1)], which indicates whether an edge glitch has occurred at E0. Note that the CDR circuit can also use the outputs of XOR gates 1110 and 1112 to determine phase information of the clock signals. For example, if XOR gate 1110 outputs a "0" and XOR gate 1112 outputs a "1," which means E0 is equal to D0 and opposite to D1, the clock signals are expected to be early with respect to the data signals. On the other hand, if XOR gate 1110 outputs a "1" and XOR gate 1112 outputs a "0," the clock signals are expected to be late. In one embodiment, the outputs of XOR gates 1110 and 1112 are provided by the CDR circuit, which can obviate the need for flip-flops 1102, 1104, 1106, and 1108.

Note that the output of AND gate 1114 indicates whether an edge glitch has occurred at E0, and its output is re-timed to DCLK and coincides with the rising edge of D1.

In further embodiments, the outputs of AND gates 1114 can be coupled to a counter which tracks the total number of edge glitches. This counter can be triggered by a rising edge in the output of AND gate 1114. The receiver system can then determine whether to issue an LOS alert based on the total number of detected edge glitches. In some embodiments, the receiver can set a threshold based on the percentage of edge glitches with respect to the total number of received bits, or based on the percentage of edge glitches with respect to the total number of transition edge samples which can potentially be edge glitches (i.e., a transition edge sample between two "like" data samples). Note that the LOS detection mechanism can be configured to run intermittently, trading off bandwidth for reduced power consumption. Other LOS alert generation schemes are also possible.

Reliable Operation

Figure 12:
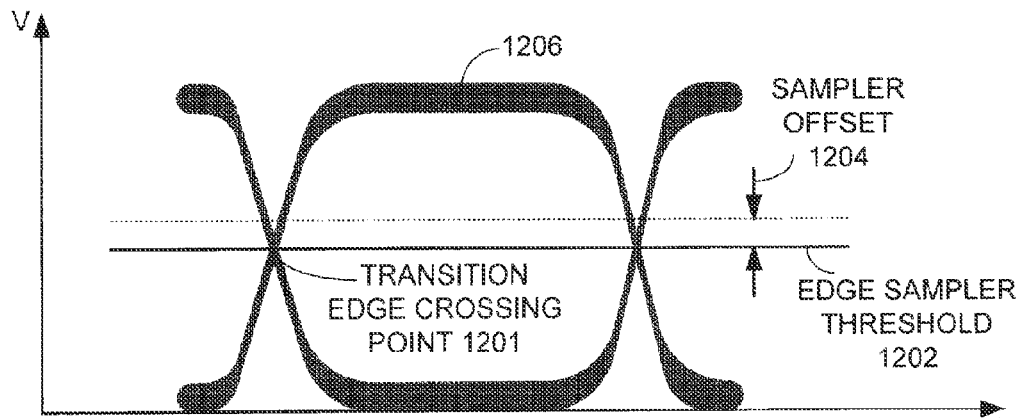
FIG. 12 illustrates an edge sampler threshold maintained substantially at the transition edge crossing point.

In the exemplary circuits described above, it is assumed that the voltage threshold of the edge samplers is maintained within the range of thermal noise from the data transition edge crossing point. FIG. 12 illustrates an edge sampler threshold maintained substantially at the transition edge crossing point. As shown in FIG. 12, an eye diagram 1206 indicates a transition edge crossing point 1201. An edge sampler threshold voltage 1202 is maintained substantially at the transition edge crossing point 1201. This configuration ensures that in the absence of an incoming data signal, in which the receiver samplers are effectively sampling thermal noise, the samplers will produce a nearly random data distribution with comparable occurrences of "0"s and "1"s.

It is possible, however, that the actual sampler threshold voltage may deviate from the transition edge crossing point due to, for example, variations in device characteristics and/or environmental parameters. As shown in FIG. 12, the actual sampler threshold may exhibit a sampler offset 1204. In some embodiments, the system can tolerate such sampler offset to a certain degree, so long as the sampler offset is sufficiently small relative to the reach of unbounded thermal noise.

In the case that the transmitter is de-coupled from the receiver, or when the signal has degraded significantly, thermal noise will dominate the received signal. For the edge-based LOS detection to function properly, the edge and data samplers' threshold is ideally within the thermal noise range, so that both the edge and data samplers can still observe a relatively random, uncorrelated distribution of "0"s and "1"s at the transition edges.

Figure 13:
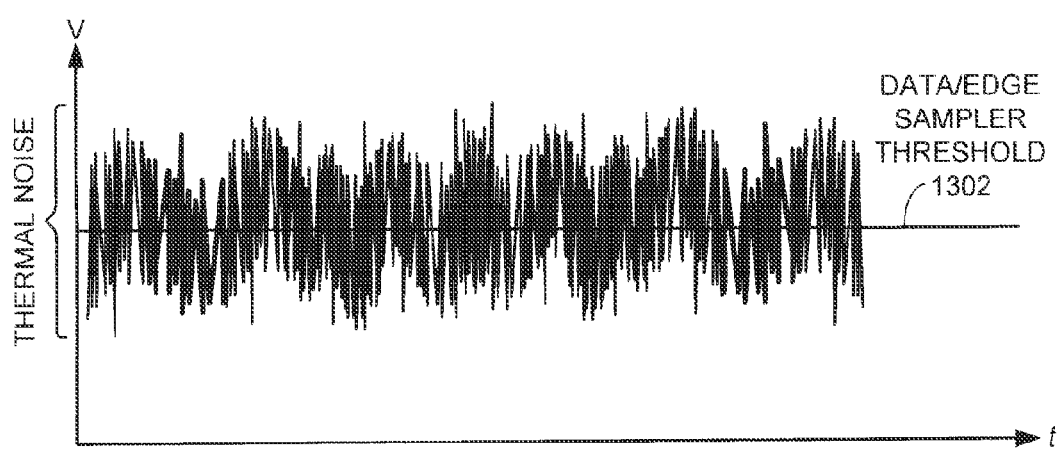
FIG. 13 illustrates a data/edge sampler threshold setting with respect to the thermal noise.

FIG. 13 illustrates a data/edge sampler threshold setting with respect to the thermal noise. Ideally, a data/edge sampler threshold voltage 1302 is maintained substantially at the midpoint of the thermal noise voltage range. In practice, the LOS detection can still function properly so long as the sampler threshold is within the thermal noise range.

Edge-Based Voltage Measurement and Data Rate Negotiation

Besides LOS detection, the aforementioned edge-glitch detection can also be used for additional purposes, such as signal voltage swing measurement and data rate negotiation.

Since the operation of edge samplers does not affect the data samplers, it is possible to manipulate the edge sampler threshold and measure the signal voltage swing using edge-glitch detection.

For example, the system can include an edge sampler threshold servo circuit that sweeps the edge sampler threshold between a high voltage level and a low voltage level. The system observes at what point along the sweep edge glitches begin to occur. During operation, when two successive data bits are of the same logical value, say "1," both data bits exhibit the same high voltage level (e.g., 3 volts). When the edge sampler threshold is set at the transition edge crossing point (e.g., 1.5 volts), the edge sampler detects a logical "1" at the transition edge between the two data bits. However, if the system adjusts the edge sampler threshold to 3.1 volts, the edge sampler would detect an edge glitch, because the logical value at the transition edge would be "0," despite being flanked by two "1" data bits. Therefore, by sweeping the edge sampler threshold and observing when an edge glitch occurs, the system can determine the high and low voltage levels of the current incoming data signal. Alternatively, the high/low voltage level can be defined at the point at which edge glitches account for some proportion (e.g., 50%) of all captured transition edge samples which can potentially be edge glitches (e.g., a transition edge sample between two "like" data samples).

In one embodiment, the system determines the low voltage level of the incoming data signal when edge glitches occur between two consecutive data bits with logical values of "0." Similarly, the system determines the high voltage level of the incoming data signal when edge glitches occur between two consecutive data bits with logical values of "1."

Figure 14:
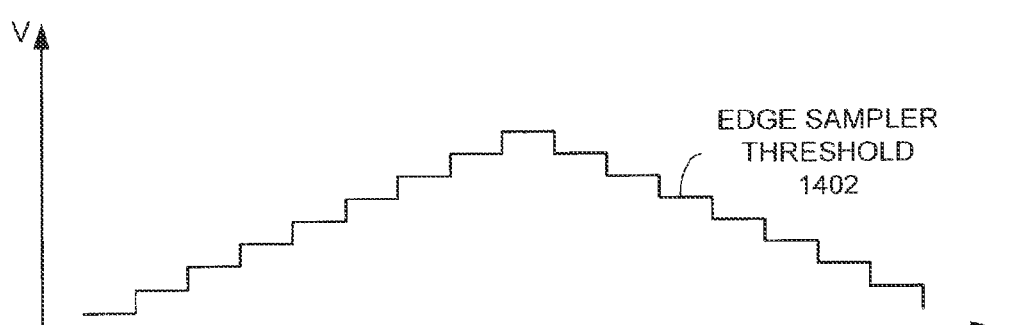
FIG. 14 presents an exemplary voltage-time diagram for a sweeping edge sampler threshold voltage.

FIG. 14 presents an exemplary voltage-time diagram for a sweeping edge sampler threshold voltage. In one embodiment, the system periodically adjusts an edge sampler threshold 1402. When an edge glitch is detected, the threshold voltage value at that moment is considered to be substantially equal to the high or low voltage level of the incoming data signal. Alternatively, the high/low voltage level can be defined at the point at which edge glitches account for some proportion (e.g., 50%) of all captured transition edge samples which can potentially be edge glitches (e.g., a transition edge sample between two "like" data samples). Note that this method can also be used to generate warning signals, such as an LOS signal, to alert signal degradation. In a further embodiment, the receiver sampler threshold can be servoed in a binary search (rather than linear) manner.

For the aforementioned embodiments, the sampler offset threshold controller ideally has a voltage throw greater than the expected swing of the incoming data signal. In many cases, however, such as in the case of signaling standard compliance, it is sufficient to ensure that the voltage swing of the incoming signal is greater than a certain level. To support this functionality, it is sufficient to set the sampler threshold to a calibrated voltage offset (rather than a sampler threshold sweep) and monitor edge glitches using this sampler threshold. In one embodiment, the sampler threshold is set to the minimum high voltage level to check for edge glitches, after which the sampler threshold is set to the maximum low voltage level to check for edge glitches. If no edge glitches (or a sufficiently small proportion of edge glitches) are detected, the incoming data signal can be determined to be compliant.

Note than in the previous embodiments related to edge-based voltage measurement, the CDR circuitry for the phase control module in a receiver, such as phase control module 106 in the example in FIG. 1, ideally is temporarily suspended to prevent the integration of invalid early/late statistics.

The described edge-based LOS detection scheme is triggered not only by actual signal loss, but also by unusable signals. For example, the received data signal may exhibit nominal signal swing, but may be at an invalid data rate from the perspective of the receiver. For example, if the incoming data rate is 2 Gbps while the receiver operates at 1 Gbps, a receiver using a conventional LOS detection mechanism would not be able to distinguish the incoming signal from a usable signal with a valid data rate. Edge-based LOS detection, on the other hand, can successfully detect such unusable data rates by declaring LOS. This is because the incoming data at an invalid data rate would seem random, and edge glitches will occur in abundance.

Figure 15:
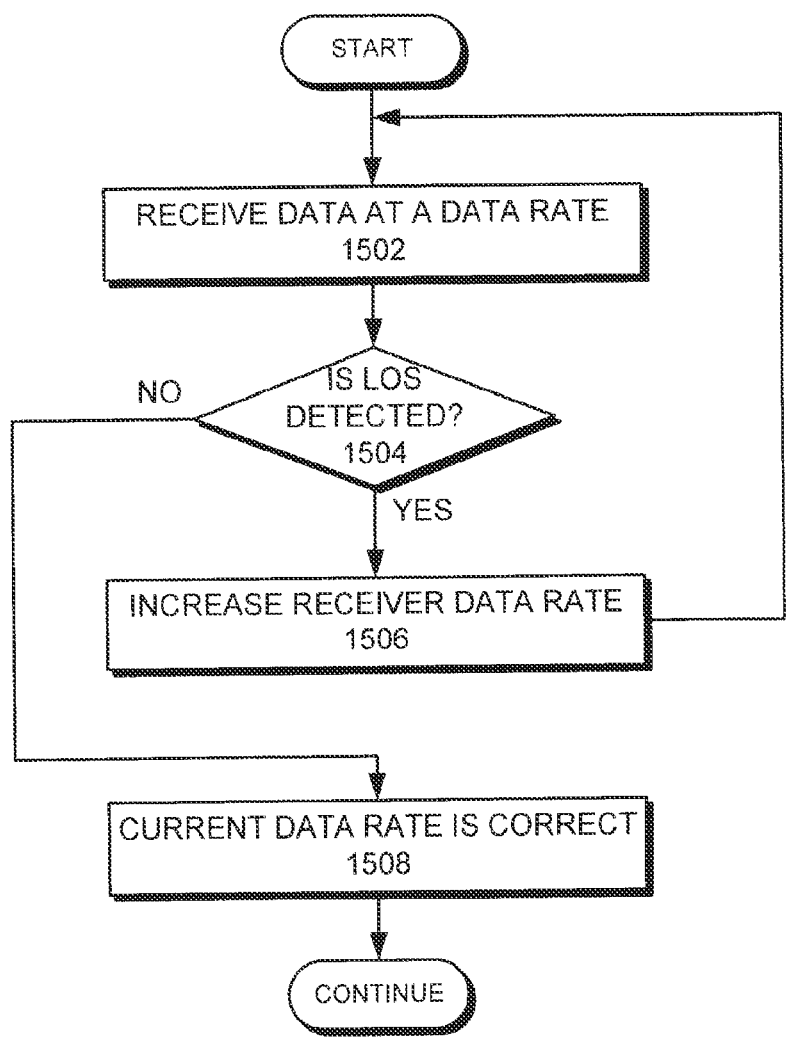
FIG. 15 presents a flow chart illustrating an exemplary process of data rate negotiation using edge-based LOS detection.

In one embodiment, the receiver performs data rate negotiation using edge-based LOS detection. FIG. 15 presents a flow chart illustrating an exemplary process of data rate negotiation using edge-based LOS detection.

During operation, the receiver receives data at the lowest available data rate (operation 1502). The receiver then determines the LOS status based on edge glitch detection (operation 1504). If the edge-based LOS detection mechanism produces an LOS signal, it signifies either that the receiver cannot lock to the incoming data signal or that the receiver is under-sampling (i.e., turning data bits into edge glitches). The receiver then increases its data sampling rate to the next lowest available data rate (operation 1506). If the receiver does not produce the LOS signal, the receiver determines that the current data rate is correct (operation 1508), and continues normal operation. Otherwise, the receiver continues to increase its data sampling rate until the LOS signal disappears (operation 1506).

Note that the edge-based LOS detection mechanism will generate an LOS signal if an incoming data stream is being under-sampled, and it will also generate an LOS signal if an incoming data stream is being over-sampled at a non-integer multiple of the proper data rate. However, the LOS detection mechanism may not be able to determine whether an incoming data stream is being over-sampled at an integer multiple of the proper data rate. Hence, the data rate negotiation process ideally begins at the lowest data rate available to the receiver. Note that when the receiver detects an edge glitch, it can either signal the transmitter to change the transmitter's data rate, or change the receiver's data rate in an attempt to match that of the transmitter.

The components of the edge-based LOS detection mechanism described above can include any collection of computing components and devices operating together. The components of the edge-based LOS detection mechanism can also be components or subsystems in a larger computer system or network. Components of an edge-based LOS detection mechanism can also be coupled among any number of components (not shown), for example, buses, controllers, memory devices, and data input/output (I/O) devices, in any number of combinations. Many of these system components may be situated on a common printed circuit board or integrated circuit, or may be integrated in a system that includes several printed circuit boards or ICs that are coupled together in a system, for example, using connector and socket interfaces such as those employed by personal computer motherboards and dual inline memory modules ("DIMM"). In other examples, complete systems may be integrated in a single package housing a system in package ("SIP") type of approach. Integrated circuit devices may be stacked on top of one another and utilize wire bond connections to effectuate communication between devices or may be integrated on a single planar substrate in the package housing.

Further, functions of the edge-based LOS detection mechanism can be distributed among any number/combination of other processor-based components. The edge-based LOS detection mechanism described above includes, for example, various DRAM systems, serial links, and parallel links. As examples, the DRAM memory systems can include DDR systems like DDR SDRAM, as well as DDR2 SDRAM, DDR3 SDRAM, and other DDR SDRAM variants, such as Graphics DDR ("GDDR") and further generations of these memory technologies, including GDDR2 and GDDR3, but are not limited to these memory systems.

Aspects of the edge-based LOS detection mechanisms described herein may be implemented as functionality programmed into any of a variety of circuitry, including programmable logic devices (PLDs), such as field programmable gate arrays (FPGAs), programmable array logic (PAL) devices, electrically programmable logic and memory devices, and standard cell-based devices, as well as application specific integrated circuits (ASICs). Some other possibilities for implementing aspects of the edge-based LOS detection mechanisms include: microcontrollers with memory (such as electronically erasable programmable read only memory (EEPROM), embedded microprocessors, firmware, software, etc.). Furthermore, aspects of the edge-based LOS detection mechanism may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The foregoing descriptions of embodiments described herein have been presented only for purposes of illustration and description. They are not intended to be exhaustive or to limit the embodiments to the forms disclosed. Accordingly, many modifications and variations will be apparent to practitioners skilled in the art.

What is claimed is:

1. A loss-of-signal (LOS) detector, comprising:
   at least one sampler to sample data bits carried by an incoming data signal and to sample the incoming data signal at a time between two consecutive data bits; and
   circuitry to determine based on outputs of the at least one sampler whether an edge glitch has occurred between the two consecutive data bits and to generate a LOS signal based on the determination.

2. The LOS detector of claim 1, wherein the circuitry is to detect an edge glitch when the two consecutive data bits are of the same logical value and when the sample taken between the two consecutive data bits has a different logical value than the same logical value.

3. The LOS detector of claim 1, embodied in an integrated circuit to receive the incoming data signal as a differential signal, wherein the at least one sampler is coupled to the differential signal.

4. The LOS detector of claim 1, embodied in an integrated circuit to receive the incoming data signal as a single-ended signal, wherein the at least one sampler is coupled to the single-ended signal.

5. The LOS detector of claim 1, embodied in a field programmable logic array (FPGA) chip.

6. The LOS detector of claim 1, further comprising instructions stored on machine-readable media that when executed are to cause the circuitry to determine based on outputs of the at least one sampler whether the edge glitch has occurred between the two consecutive data bits and to generate a LOS signal based on the determination.

7. The LOS detector of claim 6, wherein the instructions stored on machine-readable when executed are further to cause the circuitry to receive the two consecutive data bits in the form of a data word representing more than two consecutive data bits and to receive an edge word representing more than two samples of the incoming data signal the time between consecutive sets of consecutive data bits, and to determine based on the data word and the edge word whether the edge glitch has occurred.

8. The LOS detector of claim 1, wherein the at least one sampler comprises at least one first sampler to sample the two consecutive data bits of the incoming data signal, each of the two consecutive data bits being associated with a respective unit interval, and a second sampler to sample the incoming data signal in between consecutive data bits at a boundary between the respective unit intervals.

9. The LOS detector of claim 1, further comprising circuitry to selectively sweep the second sampler through at least one of a range of multiple thresholds or a range of different sampling timing during use of the second sampler to sample the incoming data signal.

10. The LOS detector of claim 1, wherein the circuitry is to count a number of edge glitches and to generate the LOS signal in dependence on the number of edge glitches.

11. The LOS detector of claim 10, where the circuitry is to generate the LOS signal in dependence on the number of edge glitches relative to a total number of samples taken at the times in between consecutive bits of common logic state.

12. A loss-of-signal detector, comprising:
    means for sampling data bits carried by an incoming data signal and for sampling the incoming data signal at a time between two consecutive data bits; and
    means for determining whether an edge glitch has occurred between the two data bits and for generating a LOS signal based on the determination.

13. A receiver, comprising:
    a clock and data recovery (CDR) circuit having
        at least one sampler to sample data bits carried by an incoming data signal and to sample the incoming data signal at a time in between two consecutive data bits, and
        a locked-loop circuit to generate a recovered clock in dependence on samples produced by the at least one sampler; and
    circuitry to determine based on outputs of the at least one sampler whether an edge glitch has occurred between the two consecutive data bits and to generate an LOS signal based on the determination.

14. The receiver of claim 13, wherein the LOS detector is to detect an edge glitch when the two consecutive data bits represent a first logical value and the sample at the time between these data bits represents a second logical value.

15. The receiver of claim 14, where the locked-loop circuit is to update the recovered clock when the two consecutive data bits represent different logical values, in dependence on the sample taken at the time in between two consecutive data bits representing the different logical values.

16. The receiver of claim 14, embodied in a field programmable logic array (FPGA).

17. The LOS detector of claim 1, embodied in a receiver having a clock and data recovery (CDR) circuit, the CDR circuit including at least one data sampler and an edge sampler and generating a recovered clock in dependence on samples produced by the at least one data sampler and samples produced by the edge sampler, wherein:
    the at least one sampler includes the at least one data sampler and the edge sampler of the CDR circuit; and
    the circuitry is to generate the LOS signal in dependence on the samples produced by the at least one data sampler and the edge samples produced by the edge sampler.

18. The LOS detector of claim 17, wherein:
    the CDR circuit is to generate a recovered clock in dependence on samples produced by the data sampler which represent two consecutive bits having dissimilar logic states and in dependence on a sample produced by the edge sampler which represents a transition between the dissimilar logic states; and
    the circuitry is to generate the LOS signal in dependence on samples produced by the data sampler which represent two consecutive bits having a common logic state and in dependence on a sample produced by the edge sampler taken in between the two consecutive bits having the common logic state.

19. The LOS detector of claim 17, wherein:
    the at least one data sampler comprises at least two samplers, including a first sampler that when operated is clocked according to a first data clock signal to generate first data samples, and a second sampler that when operated is clocked according to a second data clock signal to generate second data samples;
    the edge sampler when operated is clocked according to an edge clock; and
    each of the first data clock, the second data clock and the edge clock have a common frequency but a respective phase.

20. The LOS detector of claim 19, wherein the incoming data signal is a multi-data rate signal having interleaved bits of data corresponding to respective phases, and wherein the first sampler is to sample bits of a first one of the respective phases in response to the first data clock and the second sampler is to sample bits of a second one of the respective phases in response to the second data clock.

21. The LOS detector of claim 19, wherein the LOS detector further comprises:
  circuitry to retime at least two of the first data samples, the second data samples, and samples from the edge sampler to a common clock domain; and
  circuitry to compare the first data samples, the second data samples and the samples from the edge sampler in the common clock domain.

22. A loss-of-signal (LOS) detector, comprising:
  at least one first sampler to sample an incoming data signal within unit intervals corresponding to data bits, to generate data samples;
  a second sampler to sample the incoming data signal at transitions between the unit intervals;
  circuitry to determine when two consecutive bits of the data bits have a like state;
  circuitry to determine when a sample from the second sampler between the consecutive bits has a state that is different from the like state; and
  circuitry to generate a LOS signal in dependence on the determination that the sampler from the second sampler has the state that is different from the like state.

23. The LOS detector of claim 22, wherein the circuitry to determine when the two consecutive bits of the data bits have the like state is at least partially controlled by software and wherein the circuitry to determine when the sample from the second sampler has the state that is different is at least partially controlled by software.

24. An integrated circuit, comprising:
  at least one first sampler to sample an incoming data signal within unit intervals corresponding to data bits, to generate data samples;
  a second sampler to sample the incoming data signal at transitions between the unit intervals;
  loss-of-signal (LOS) detector circuitry to determine when the two consecutive bits of the data bits have a like state, to determine when a sample from the second sampler between the consecutive bits having the like state corresponds to a state different from the like state, and to generate an LOS signal in dependence on the determination that the sampler from the second sampler has the state that is different from the like state; and
  clock and data recovery (CDR) circuitry to determine when the two consecutive bits of the data bits have unlike states and to update a recovered clock in dependence on a sample from the second sampler between the consecutive bits having the unlike states.

25. The integrated circuit of claim 24, wherein the integrated circuit is to receive the incoming data signal as a differential signal, wherein each of the at least one first sampler and the second sampler are coupled to the differential signal.

26. The integrated circuit of claim 24, wherein the at least one first sampler comprises a first phase sampler and a second phase sampler, each of the first phase sampler and the second phase sampler to sample respective ones of the unit intervals.

27. The integrated circuit of claim 24, embodied as a field programmable logic array (FPGA) integrated circuit.

* * * * *